Nov. 7, 1972   R. K. EGNACZAK   3,702,289
PHOTOELECTROPHORETIC PROCESS AND APPARATUS
Filed Oct. 28, 1970   3 Sheets-Sheet 1

INVENTOR.
RAYMOND K. EGNACZAK
BY
ATTORNEY

United States Patent Office

3,702,289
Patented Nov. 7, 1972

3,702,289
PHOTOELECTROPHORETIC PROCESS AND
APPARATUS
Raymond K. Egnaczak, Williamson, N.Y., assignor to
Xerox Corporation, Stamford, Conn.
Filed Oct. 28, 1970, Ser. No. 84,831
Int. Cl. B01k 5/02
U.S. Cl. 204—181                             16 Claims

ABSTRACT OF THE DISCLOSURE

A photoelectrophoretic device includes an imaging roller and transfer roller designed to travel over a film sheet having a rupturable ink pod. A blocking web is laid over the film sheet and picked up by the imaging roller during its travel. A receiver web is looped over a transfer roller and the loop is advanced across the imaged film sheet to pick up an image.

BACKGROUND OF THE INVENTION

This invention relates to imaging systems and in particular to a novel method and apparatus for the photoelectrophoretic imaging process. Even more specifically, this invention relates to a photoelectrophoretic camera.

In the photoelectrophoretic imaging process, an image is formed from an imaging suspension or ink by subjecting the ink to an electric field and exposing it to activating electromagnetic radiation, e.g., light in the visible spectrum. The imaging suspension is composed of light sensitive particles suspended within an insulating liquid carrier. The particles are believed to bear a net electrical charge while in suspension. Conventionally, the ink is placed between injecting and blocking electrodes used to establish the electric field and is exposed to a light image through one of the electrodes which is at least partially transparent. According to one theory, particles attracted to the injecting electrode by the electric field exchange charge with the injecting electrode when exposed to light and migrate under the influence of the field through the liquid carrier to the blocking electrode. As a result of the migration, positive and negative images are formed on the two electrodes. The blocking electrode is covered with a dielectric material to minimize charge exchange and thereby prevent the particles from oscillating back and forth between the two electrodes.

The photoelectrophoretic imaging process is either monochromatic or polychromatic depending upon whether the light sensitive particles within the liquid carrier are responsive to the same or different portions of the light spectrum. A full color polychromatic system is obtained, for example, by using cyan, magenta and yellow colored particles which are responsive to red, green and blue light respectively. An extensive and detailed description of the photoelectrophoretic process is found in U.S. Pats. 3,384,- 565 and 3,384,484 to Tulagin and Carreira, 3,383,993 to Yeh and 3,384,566 to Clark.

Present photoelectrophoretic imaging systems employ injecting and blocking electrodes (hereafter occasionally referred to generically as "imaging electrodes" because complementary positive and negative images are formed on them) that are rollers or drums, flat or curved plates or, in some instances, webs or sheets. Conventionally, images or copies are formed in a line-by-line fashion in a narrow nip (interface area) between electrodes as one electrode moves relative to the other. Various combinations of these electrodes have been successfully used in a variety of system embodiments capable of producing high quality images. There is a continuing need, however, for simple mechanical configurations that are portable or at least compact in order to perform the functions of familiar hand-held or tripod mounted cameras.

Accordingly, it is an object of this invention to enhance the mechanisms employed in carrying out the photoelectrophoretic imaging process.

A specific object of this invention is to devise novel web handling methods and means for the photoelectrophoretic imaging process.

Another object of this invention is to build a novel, simple hand-held or tripod supported camera for photoelectrophoresis.

Still another object of the present invention is to devise novel electrode structures for the photoelectrophoretic process.

Yet another object of this invention is to eliminate corona generation over an exposed photoelectrophoretic ink.

These and other objects are realized with a photoelectrophoretic imaging system using a flat plate as one of the system electrodes and a web-roller combination for other system electrodes. A film sheet containing a rupturable pod is stretched tightly over a transparent conductive plate through which full frame exposure is directed. The film sheet includes a transparent section on which an image is formed. A blocking web wound between feed and take-up reels is functionally the blocking electrode for the system. The blocking web is wrapped around an imaging roller that is a conductive member for establishing an electric field between the roller and plate. The blocking web is laid out over the film sheet and is wound up onto the take-up reel as the imaging roller travels across the film sheet spreading the ink from which an image is formed. In one embodiment, a conductive backing is coupled to the blocking sheet to prevent generation of unwanted corona currents.

A transfer roller follows the imaging roller across the film sheet. A receiver web is supported between a supply reel and holding clamps and is formed into a U-shaped loop around the transfer roller. As the transfer roller moves across the imaged film sheet, the loop also moves across the film sheet and the ink image formed on the film sheet is transferred to the receiver sheet. The receiver sheet is then puled from the apparatus and severed to provide a final copy.

Some of the unique features of this invention include the fact that neither the blocking nor the receiver webs move laterally relative to the film sheet. The blocking web is initially laid over the film sheet and is continuously picked up as the imaging roller travels over the film sheet. The receiver web is continuously brought into and out of contact with the film sheet as the transfer roller travels over the film sheet.

DESCRIPTION OF THE DRAWINGS

Other objects and features of this invention will be apparent from the present description and from the drawings which are.

DESCRIPTION OF THE INVENTION

Figure 1:
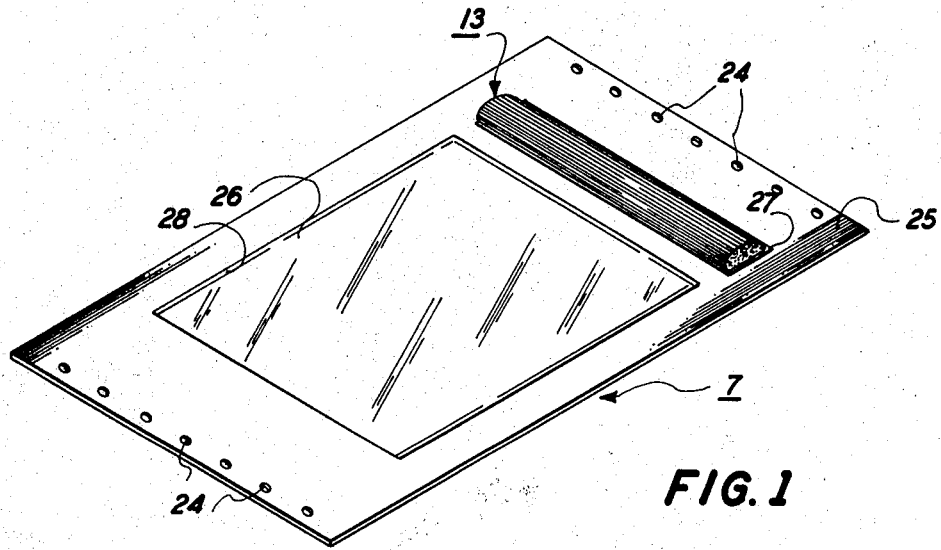
FIG. 1 is a perspective view of the film sheet used in the present imaging systems.

The methods and apparatus of this invention are readily understood from the drawings. The photoelectrophoretic camera 1 includes a bellows section 2 and housing 3 coupled together by frame 4. The functional components include the flat plate 5, film sheet 7, blocking web 8, imaging roller 9, transfer roller 10 and receiver web 12. The film sheet includes the pod 13 that contains either monochromatic or polychromatic photoelectrophoretic ink.

Copies are produced in the following manner. A full frame optical image is projected through transparent plate 5 and sheet 7 by the lens 14 when shutter 15 is open. The carriage 17 supporting rollers 9 and 10 moves across the film sheet left to right. The imaging roller 9 ruptures pod 13 and spreads a bead of ink across the film sheet. A high voltage difference is coupled between the flat plate and the imaging roller both of which are conductive. (The film sheet and/or a backing on the blocking web may also be conductive.) The high electric field established and the activating electromagnetic radiation in the configuration of an image cause particles in the ink to be driven from the film sheet to the blocking web creating a positive image on the film sheet and a negative image on the blocking web. The transfer roller follows behind the imaging roller and has an appropriate voltage coupled to it to effect transfer of the positive image to the receiver web. The receiver web is pulled from the camera and severed to yield a copy of the scene projected to the ink.

Figure 2:
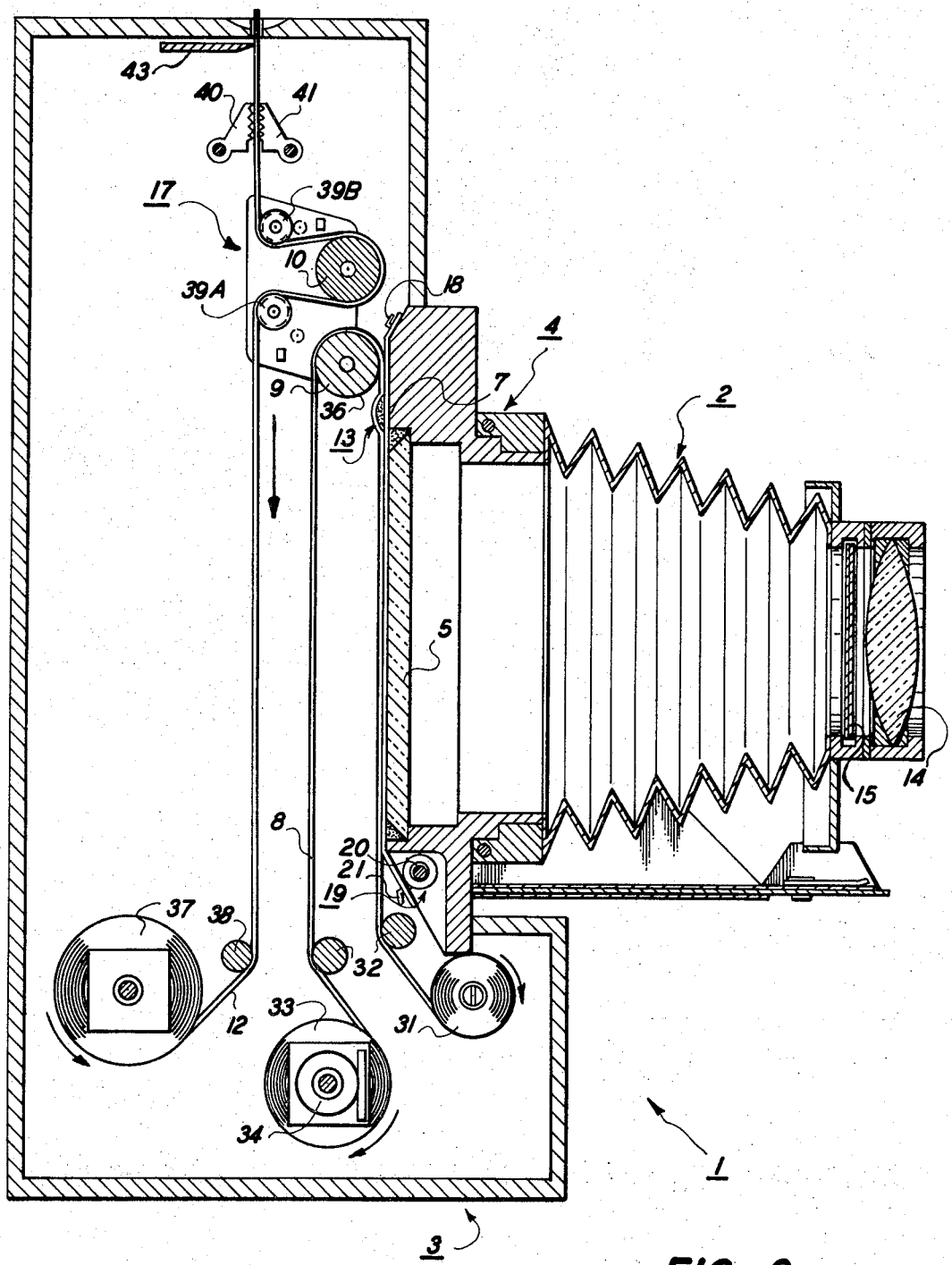
FIG. 2 is a cross-section view of the appartus of the present invention showing the imaging and transfer rollers in their initial positions.

The frame 4 is the support for the transparent plate 5 and the bellows. The plate 5 is composed of a transparent glass coated on the housing side with a very thin conductive layer that is transparent. Typically, the transparent conductor is tin oxide. The frame also includes the hooks 18 and tension member 19 having shaft 20 with a plurality of fingers 21. The hooks and tension member are used to stretch the film sheet tautly across plate 5. The film sheet is best seen in FIG. 1 and has the holes 24 along opposite edges for mating with hook 18 and fingers 21. The tension member includes an appropriate bias spring that continuously exerts a counterclockwise force (as viewed in FIG. 2) on the shaft 20. The shaft is rotated clockwise by hand to permit the holes in the film sheet to be slipped over the fingers and the hooks. When released, the tension member stretches the film sheet tightly over the plate 5.

The film sheet 7 is made with the paper 25 and the transparent material 26. The transparent material is connected to the underside of paper 25 while the ink pod 13 is connected to the upper or opposite side. The pod is a paper bag 27 glued or otherwise appropriately connected to paper 25. The paper has the cutout 28 in it that forms a border for the ink image created on the transparent material. The ink is spread substantially over the entire donor sheet when the pod is broken forming a dense coat. After the ink is exposed to light (electromagnetic radiation to which it is responsive) and electric field, the image has a border formed with a dense concentration of pigment since in border areas ink particles are not driven toward the blocking sheet. This border is eliminated simply by separating the transparent material 26 from the paper 25.

The transparent material 26 may be any suitable material such as a transparent resinous material. It may be preferred with certain photoelectrophoretic inks to coat a transparent conductive layer on the side of material 26 facing the pod 13 in order to improve the injection of charge into particles exposed to light. The conductive layer on flat plate 5 serves as an electrode for establishing a high electric field across the ink but the transparent layer on material 26 may serve that function.

The blocking web 8 is an electrically insulating material that functionally serves as the system blocking electrode. In one embodiment it includes a conductive backing so that there is no field across air in the gap between the roller and the blocking web. The web 8 is wound on the feed reel 31, passed upward over idler roller 32, stretched over the film sheet 7, wrapped around the imaging roller 9 and wound onto the take-up reel 33. Take-up reel is drivenly coupled to an appropriate motor 34 that is the sole mechanical driving source for the camera.

Motor 34 is coupled to take-up reel 33 through a one-way clutch. When energized, motor 34 winds web 8 onto reel 33 and in the process pulls the carriage 17 across the film sheet. Imaging roller 9 breaks the ink pod 13 and spreads the ink outward between the film sheet and the web 8. The bead is restrained from uncontrollably flooding the camera because the web 8 and sheet 7 form a conduit through which the liquid ink is pushed or pumped by the roller. The imaging roller is coupled to an appropriate voltage source and subjects the ink between it and the film sheet to a sufficiently intense electric field. (The film sheet 7 and/or flat plate 5 are normally coupled to ground.)

When the blocking web 8 includes a conductive backing, the field between the leading edge 36 of the roller and web 8 is reduced to zero thereby eliminating corona currents in that area.

The blocking web 8 does not move laterally relative to the film sheet but rather is picked up vertically, after imaging, because it is being wound onto reel 33 after being wrapped around the imaging roller. This means that no critical mechanical system is needed to prevent unwanted oscillations, mechanical or electrical, between the blocking web and film sheet from interfering with the imaging process, i.e. photoelectrophoresis.

The ink image formed on the transparent material 26 of the film sheet may be transferred to a white backing such as receiver web 12. Web 12 is pulled from supply reel 37, folded over the idler roller 38, looped over transfer roller 10, folded over concentric idler rollers 39A and 39B and finally is gripped between the opposed jaws 40 and 41. A knife edge 43 is provided for severing web 12.

When carriage 17 is pulled across the film sheet, the loop formed around the transfer roller travels over the image. The transfer roller is coupled to an appropriate voltage source to create an electric field opposite in direction to that used in the imaging process. This field effects transfer of the ink image to the receiver web.

A noteworthy feature of the receiver web handling system is that the receiver web never moves, i.e. it is not fed onto or off a reel during the transfer process laterally. The loop formed around the transfer roller moves but not the web itself.

In the vase of the web handling systems for both the blocking and receiver webs, the criticality of roller rotation is removed. The blocking web is initially in contact with the film sheet so the rotational movement of the imaging roller does not affect that electrode during imaging. The loop in the receiver web is moved across the film sheet by the translational velocity of the transfer roller. Consequently, the rotational velocity of the transfer roller is not critical. It is preferable, however, that the rollers 9 and 10 be rotated at an angular velocity that establishes a near zero relative velocity between the periphery of the rollers and the film sheet, i.e. a peripheral velocity equal and opposite to the translational velocity.

Figure 3:
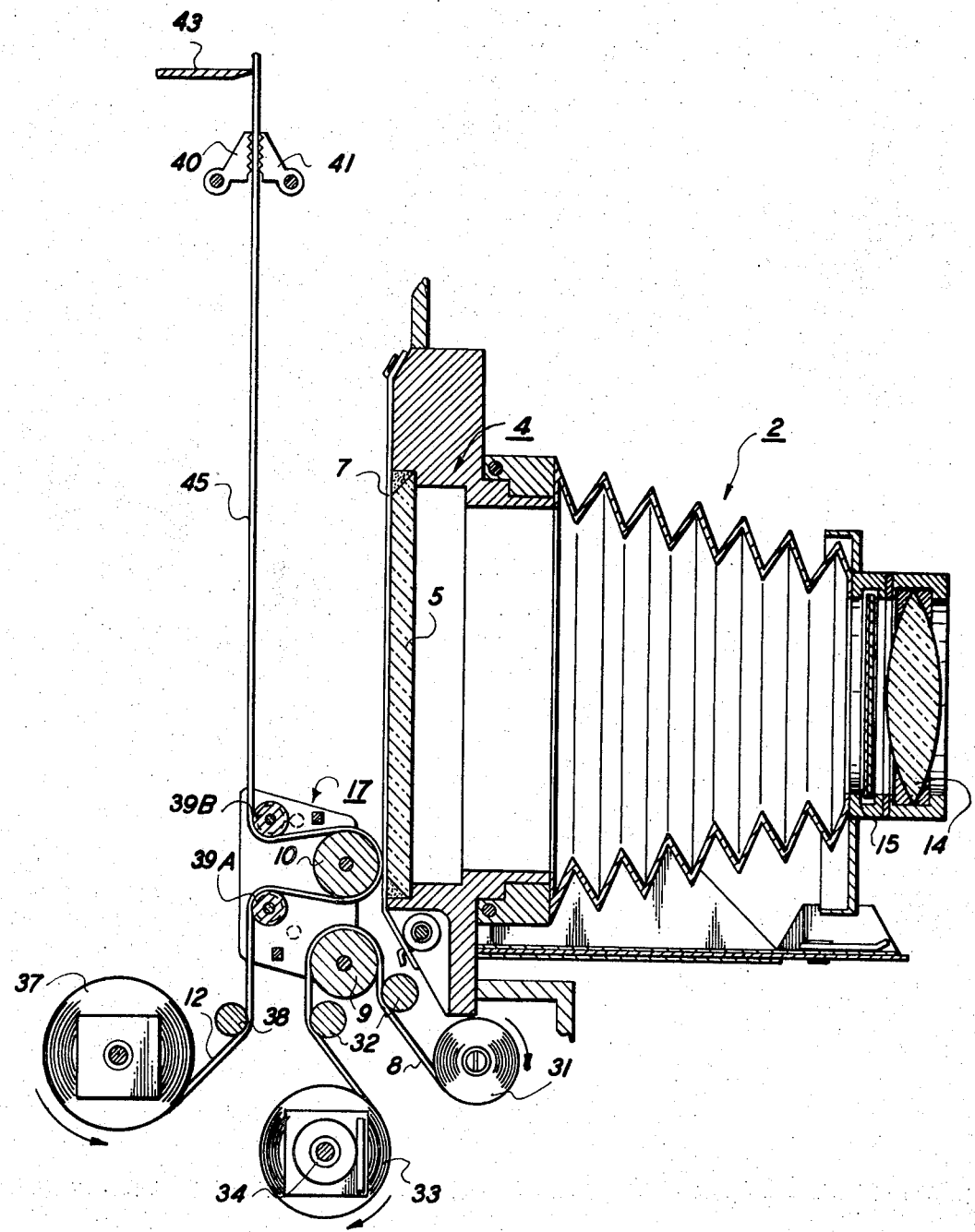
FIG. 3 is a partial side view of the apparatus in FIG. 2 showing the imaging and transfer rollers near their leftmost position.

When the carriage 17 travels to the left beyond the position indicated in FIG. 3 to a point where there is clearance between web 8 and sheet 7, the ink image is transferred to the receiver web and is contained substantially on the portion 45 to the right of idler 38. To remove the ink image on web portion 45, the jaws 40 and 41 are opened and the web pulled by hand until it clears the housing 3. The knife edge 43 is then used to sever the web. The idlers 39A and 39B do not smear the image because they contact the web only over a limited area near the edges. The central portion of idlers 39A and 39B is of a smaller diameter than the outer portions. After portion 45 of the receiver web is pulled out of the camera, the carriage 17 is pulled by hand back to the position shown in FIG. 2. During the return travel, a new section of blocking web is laid out over the flat plate. A fresh donor sheet is installed by separating frame 4 from housing 3. The camera is then ready for the next picture.

Figure 4:
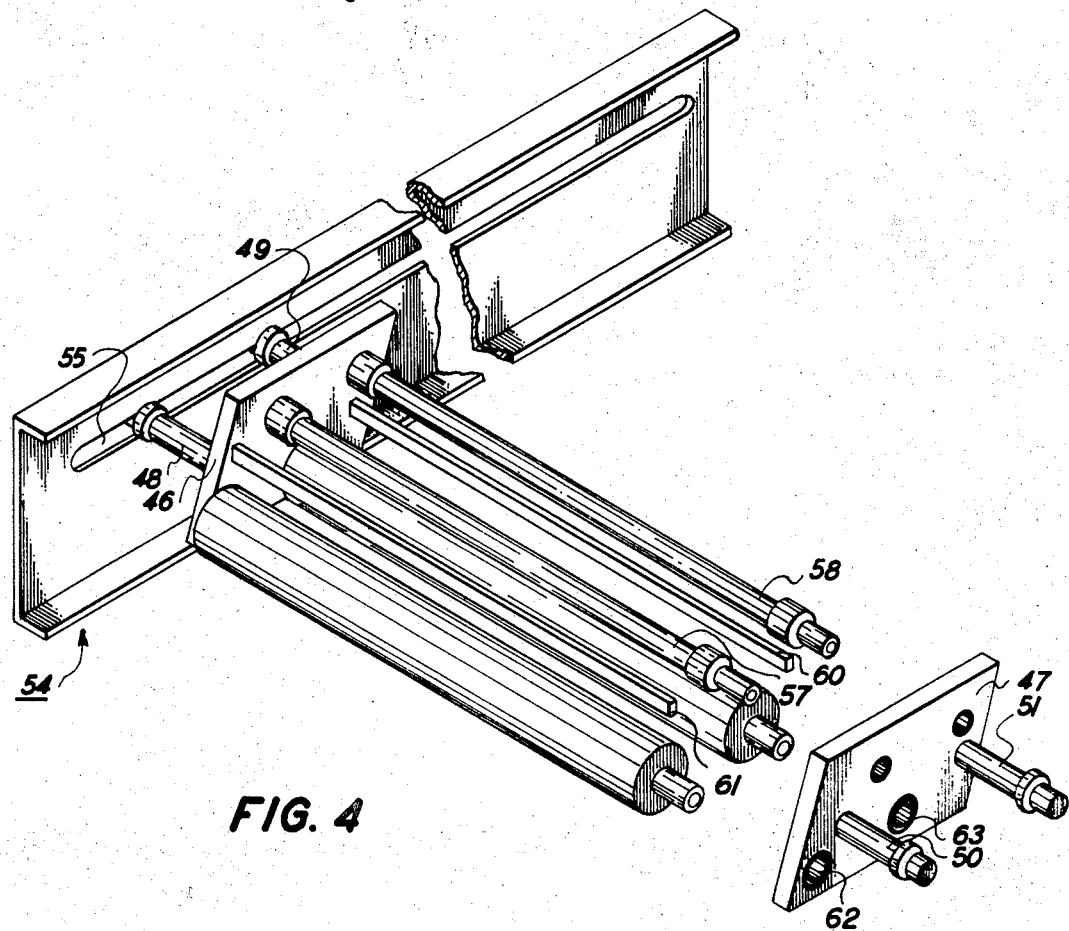
FIG. 4 is a perspective view of the support assembly for the imaging and transfer rollers.

FIG. 4 illustrates the carriage 17 in greater detail. The carriage includes two end plates 46 and 47. Each plate has two track followers, 48 and 49 on plate 46 and 50 and 51 on plate 49. These followers fit into slots cut into two U-shaped channels spaced on either side of the flat plate. Only channel 54 is shown for purposes of clarifying the description and is similar to a channel into which the followers 50 and 51 slidably fit.

Channel 54 (and a like channel on the other side of the carriage) includes the longitudinal slot 55. The two channels are positioned relative to plate 5 to force the rollers 9 and 10 under pressure against the plate 5 when the carriage is pulled over the flat plate.

The carriage 17 includes the tie rods 57 and 58 rigidly coupled between the plates 46 and 47. Two additional braces 60 and 61 are also provided to give structural strength to the carriage. Roller 9 is journaled for rotation in bearings seated in the side plates such as bearing 62. Likewise, roller 10 is journaled for rotation in bearings seated in the side plates such as bearing 63. The rollers 9 and 10 are forced against the flat plate to impart a rotational velocity to the rollers substantially equal to their translational velocities.

It is understood that various modifications can be made to the foregoing embodiments. For example, in the case when the blocking web has a conductive backing, the voltages can be applied to the backing and the plate when the rollers are moved across the film sheet to spread the ink and returned to the right hand position shown in FIG. 2. Then the shutter can be opened to cause ink particle migration and image formation without the carriage moving. The shutter is then closed and the carriage moved leftward to effect separation of the negative and positive images caused by the migration and transfer of the positive image to the receiver web. Another modification is to eliminate the imaging roller, the blocking web and reels 31 and 34 and allow the receiver web and transfer roller to perform their image forming functions. The negative image formed on the receiver web may be the desired end product. On the other hand, the positive image formed on the film sheet is available simply by removing it from the camera.

What is claimed is:

1. Photoelectrophoretic imaging apparatus comprising:
   an imaging plate supported to oppose an imaging roller traveling across one of its surfaces,
   web handling means for stretching a blocking web over said imaging plate and for pulling said web from said plate as said roller travels over said plate without lateral movement between said web and said plate, said web being anchored at one end,
   said roller and plate including means for coupling to a voltage source to establish a high electric field across photoelectrophoretic ink between said web and plate, and
   exposure means for exposing photoelectrophoretic ink between said web and plate to activating electromagnetic radiation to form an image from ink exposed to radiation and subjected to electric field.

2. The apparatus of claim 1 wherein said blocking web includes an insulating layer facing said plate and an electrically conductive backing.

3. The apparatus of claim 1 wherein said web handling means includes feed and take-up reels between which said blocking web is wound.

4. The apparatus of claim 3 wherein said take-up reel is positioned to pull said imaging roller across said plate when the blocking web is wound onto it.

5. The apparatus of claim 1 further including a film sheet positioned over said plate between the plate and said blocking web.

6. The apparatus of claim 5 wherein said film sheet includes a transparent material for forming an ink image.

7. The apparatus of claim 5 wherein said film sheet includes a rupturable pod for containing photoelectrophoretic ink.

8. The apparatus of claim 1 further including
   a transfer roller supported for travel over said plate, and
   a receiver web anchored at two separated points and looped around said transfer roller adjacent said plate, said transfer roller including means for coupling to a voltage source to establish an electric field between said transfer roller and plate to transfer ink adjacent said plate to the receiver web.

9. The apparatus of claim 8 wherein said receiver web includes paper.

10. The apparatus of claim 8 further including a carriage for journaling said imaging and transfer rollers and means for guiding said carriage over said plate such that said rollers are forced against said plate.

11. The apparatus of claim 10 wherein said blocking web is wound between feed and take-up reels and said carriage is pulled across said plate when the blocking web is wound onto the take-up reel.

12. The apparatus of claim 11 wherein said receiver web is wound onto a supply reel, looped around said transfer roller and anchored by jaw means, said supply reel dispensing a new web when the carriage is returned to its initial position after being pulled across the plate by the take-up reel.

13. Photoelectrophoretic imaging apparatus comprising:
   a plate supported to oppose a roller traveling across one of its surfaces,
   a web anchored at two ends and looped around said roller between the roller and plate,
   said plate and roller having means for coupling to a voltage source for establishing an electric field across photoelectrophoretic ink between said roller and plate, and
   exposure means for exposing photoelectrophoretic ink between said web and plate to activating electromagnetic radiation to form an image from ink exposed to radiation and subjected to field.

14. The apparatus of claim 13 further including a film sheet positioned between said web and plate and including a pod for containing photoelectrophoretic ink which is ruptured by the roller and spread over the film sheet.

15. A photoelectrophoretic imaging method comprising:
   exposing photoelectrophoretic ink between a blocking web and an imaging plate to activating electromagnetic radiation,
   separating said web from said plate by wrapping the web around an imaging roller and passing the roller over said plate without lateral movement between said web and said plate, said web being anchored at one end, while applying an electrical field across said ink to form an image from ink exposed to radiation and subjected to field.

16. The method of claim 5 further including
looping a receiver web around a transfer roller,
anchoring the ends of said receiver web and
passing said transfer roller over said plate to move said loop across the plate,
said transfer roller and plate having means for coupling to a voltage source to establish an electric field to effect transfer of ink to the receiver web.

References Cited

UNITED STATES PATENTS 3,551,320  12/1970  Krieger _____ 204—181 PE
3,565,614  2/1971  Carreira et al. ____ 204—181 PE JOHN H. MACK, Primary Examiner W. I. SOLOMON, Assistant Examiner U.S. Cl. X.R.

95—1 A; 96—1 R; 204—300; 355—3